(12) United States Patent
Kenthapadi et al.

(10) Patent No.: US 8,458,130 B2
(45) Date of Patent: Jun. 4, 2013

(54) INDEXING FOR LIMITED SEARCH SERVER AVAILABILITY

(75) Inventors: Krishnaram N. G. Kenthapadi, Mountain View, CA (US); Shuai Ding, New York, NY (US); Sreenivas Gollapudi, Cupertino, CA (US); Samuel Ieong, Mountain View, CA (US); Alexandros Ntoulas, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/040,261

(22) Filed: Mar. 3, 2011

(65) Prior Publication Data

US 2012/0226661 A1 Sep. 6, 2012

(51) Int. Cl.
*G06F 17/30* (2006.01)
(52) U.S. Cl.
CPC .............................. *G06F 17/30017* (2013.01)
USPC .......................................... 707/634; 707/752
(58) Field of Classification Search
USPC ................ 707/706, 710, 723, 728, 735, 748, 707/749, 750, 634, 636, 652, 659, 736, 752; 709/248
See application file for complete search history.

(56) References Cited

U.S. PATENT DOCUMENTS

| | | | |
|---|---|---|---|
| 6,266,658 B1 | 7/2001 | Adya et al. | |
| 7,024,418 B1 * | 4/2006 | Childress | 1/1 |
| 7,562,074 B2 * | 7/2009 | Liddell et al. | 1/1 |
| 7,752,185 B1 | 7/2010 | Kilmartin | |
| 7,962,480 B1 * | 6/2011 | Zhang et al. | 707/729 |
| 2006/0268742 A1 | 11/2006 | Chu et al. | |
| 2007/0083506 A1 * | 4/2007 | Liddell et al. | 707/5 |
| 2011/0029517 A1 * | 2/2011 | Ji et al. | 707/734 |

OTHER PUBLICATIONS

Salton et al., Term-Weighting Approaches in Automatic Text Retrieval, Jan. 26, 1988, IEEE, 513-523.*
Puppin, et al., "Query-Driven Document Partitioning and Collection Selection", Retrieved at<<http://citeseerx.ist.psu.edu/viewdoc/download?doi=10.1.1.101.6421&rep=rep1&type=pdf>>, 2006, pp. 8.
Yuwono, et al., "Server Ranking for Distributed Text Retrieval Systems on the Internet", Retrieved at<<http://citeseerx.ist.psu.edu/viewdoc/summary?doi=10.1.1.53.7887>>, Fifth International Conference on Database Systems for Advanced Applications, Melbourne, Australia, Apr. 1-4, 1997, pp. 9.
"Google SEO News and Discussion", Retrieved at<<http://www.webmasterworld.com/google/4003281.htm>>, Oct. 8, 2009, pp. 9.

(Continued)

*Primary Examiner* — Jean B Fleurantin
(74) *Attorney, Agent, or Firm* — Microsoft Corporation

(57) ABSTRACT

Documents are replicated among servers comprising a search engine based on the value of each document by approximating its value as one of the top search results for one or more exemplary queries. Documents are allocated among servers comprising a search engine by calculating a relevance value for each document and then distributing the documents evenly to the servers. A subset of servers are selected from among a plurality of servers comprising a search engine using term-based, server-specific histograms reflecting the number of instances of the term in each document allocated to each server, and then selecting servers to service a query based on the documents on those servers.

14 Claims, 4 Drawing Sheets

OTHER PUBLICATIONS

Skyvalidas, et al., "Replication Routing Indexes for XML Documents?", Retrieved at<<http://aeolus.ceid.upatras.gr/scientific-reports/2nd_year_reports/uoi-4.pdf>>, Oct. 20, 2010, pp. 12.

Shestak, et al., "A Stochastic Approach to Measuring the Robustness of Resource Allocations in Distributed Systems", Retrieved at<<http://citeseerx.ist.psu.edu/viewdoc/download?doi=10.1.1.70.7359&rep=rep1&type=pdf>>, Oct. 20, 2010, pp. 9.

Kulkarni, et al.,"Topic-based index partitions for efficient and effective selective search", Retrieved at<<http://www.cs.cmu.edu/~callan/Papers/sigir10-LSDSIR-akulkarni.pdf>>, pp. 21-26, Mar. 3, 2011.

Gravano, et al., "Generalizing gloss to vector-space databases and broker hierarchies", Retrieved at<<http://citeseerx.ist.psu.edu/viewdoc/download?doi=10.1.1.95.8617&rep=rep1&type=pdf>>, 1995, pp. 78-89.

Clarke, Charles., "TREC Terabyte Track," retrieved Mar. 3, 2011 from <<http://www-nlpir.nistgov/projects/terabyte/>>, 2004, 3 pages.

"Job Shop Scheduling," retrieved on Mar. 3, 2011 from <<http://wikipedia.org/wiki/Job_shop_scheduling>>, 3 pages.

Alon, Noga, et al., "Approximation Schemes for Scheduling on Parallel Machines," Journal of Scheduling, vol. 1, 1998, retrieved at <<http://www.cs.tau.acil/~nogaa/PDFS/aawy1.pdf>>, 13 pages.

Baeza-Yates, Ricardo, et al., "On the Feasibility of Multi-site Web Search Engines," Proceedings of the 18th ACM Conference on Information and Knowledge Management, CIKM, Nov. 2-6, 2009, retrieved at <<http://research.yahoo.net/files/paper—8.pdf>>, 10 pages.

Bawa, Mayank, et al., "Make it Fresh, Make it Quick—Searching a Network of Personal Webservers," Proceedings of the 12th international conference on World Wide Web, retrieved at <<http://citeseerx.ist.psu.edu/viewdoc/download;jsessionid=1458393496DBE6EE923A8809162C9442?doi=10.1.1.12.6194&rep=rep1&type=pdf>>, 2003, 10 pages.

Byers, John, et al., "Simple Load Balancing for Distributed Hash Tables," retrieved at <<http://citeseerx.ist.psu.edu/viewdoc/download?doi=10.1.1.12.277&rep=rep1&type=pdf>>, 2002, pp. 1-5.

Cambazoglu, B. Barla, et al., "Query Forwarding in Geographically Distributed Search Engines," Proceedings of the 33rd Annual International ACM SIGIR Conference on Research and Development in Information Retrieval, retrieved at <<http://59.108.48.12/proceedings/sigiusigir2010/docs/p90.pdf>>, 2010, pp. 90-97.

Graham, R. L., "Bounds on Multiprocessing Timing Anomalies," SIAM Journal on Applied Mathematics, vol. 17, No. 2, Mar. 1969, retrieved at <<http://citeseerx.ist.psu.edu/viewdoc/download?doi=10.1.1.90.8131&rep=rep1type=pdf>>, pp. 416-429.

Gravano, Luis, et al., "Generalizing GIOSS to Vector-space Databases and Broker Hierarchies," Proceedings of the 21th International Conference on Very Large Data Bases, 1995, retrieved at <<http://citeseerx.ist.psu.edu/viewdoc/download?doi=10.1.1.95.8617&rep=rep1&type=pdf>>, pp. 78-89.

Kulkarni, Anagha, et al., "Document Allocation Policies for Selective Searching of Distributed Indexes," International Conference on Information and Knowledge Management, Oct. 26-30, 2010, retrieved at <<http://www.cs.cmu.edu/~anaghak/cikm2010.pdf>>, 10 pages.

Kulkarni, Anagha, et al., "Topic-based Index Partitions for Efficient and Effective Selective Search," 8th Workshop on Large-Scale Distributed Systems for Information Retrieval (LSDS-IR'10), 2010, retrieved at <<http://www.cs.cmu.edut/~callan/Papers/sigir1O-LSDSIR-akulkarni.pdf>>, pp. 21-26.

Long, Xiaohui, et al., "Optimized Query Execution in Large Search Engines with Global Page Ordering," Proceedings of the 29th international conference on Very large data bases, vol. 29, 2003, retrieved at <<http://www.vldb.org/conf/2003/papers/S05P03.pdf>>, 12 pages.

Mitzenmacher, Michael, "The Power of Two Choices in Randomized Load Balancing," IEEE Transactions on Parallel and Distributed Systems, vol. 12, No. 10, Oct. 2001, retrieved at <<http://www.eecs.harvard.edu/~michaelm/postscripts/tpds2001.pdf>>, pp. 1094-1104.

Motwani, Rajeev, et al., "Randomized Algorithms," ACM Computing Surveys, vol. 28, No. 1, Mar. 1996, retrieved at <<http://penguin.ewu.edu/cscd501/Wint-2009/Probabilistic/p33-motwani.pdf>>, pp. 33-37.

Persin, Michael, et al., "Filtered Document Retrieval with Frequency-sorted Indexes," Journal of the American Society for Information Science, vol. 47, No. 10, Oct. 1996, retrieved at <<http://citeseerx.ist.psu.edu/viewdoc/download?doi=10.1.1.18.3272&rep=rep1&type=pdf>>, 31 pages.

Pitoura, Theoni, et al., "Replication, Load Balancing and Efficient Range Query Processing in DHTs," Proceedings of the 10th international conference on Advances in Database Technology, 2006, retrieved at <<http://www-poleia.lip6.fr/~gancarsk/GRBD012007/PNTedbt06.pdf>>, pp. 131-148.

Puppin, Diego, et al., "Query-Driven Document Partitioning and Collection Selection," Proceedings of the 1st international conference on Scalable information systems, 2006, retrieved at <<http://citeseerx.ist.psu.edu/viewdoc/download?doi=10.1.1.97.8297&rep=rep1&type=pdf>>, 8 pages.

Theobald, Martin, et al., "Top-k Query Evaluation with Probabilistic Guarantees," Proceedings of the Thirtieth international conference on Very large data bases, vol. 30, 2004, retrieved at <<http://citeseerxist.psu.edu/viewdoc/download?doi=10.1.1.133.2764&rep=rep1&type=pdf>>, 12 pages.

Xu, Jinx!, et al., "Cluster-based Language Models for Distributed Retrieval," Aug. 15-19, 1999, retrieved at <<http://citeseerx.ist.psu.edu/viewdoc/download?doi=10.1.1.21.1736&rep=rep1&type=pdf>>, Proceedings of the 22nd Annual International ACM SIGIR Conference on Research and Development in Information Retrieval, pp. 254-261.

\* cited by examiner

100

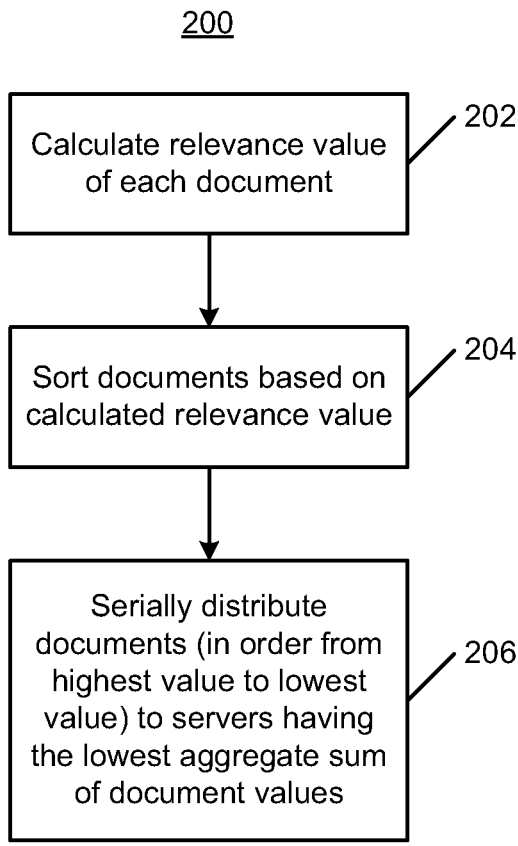
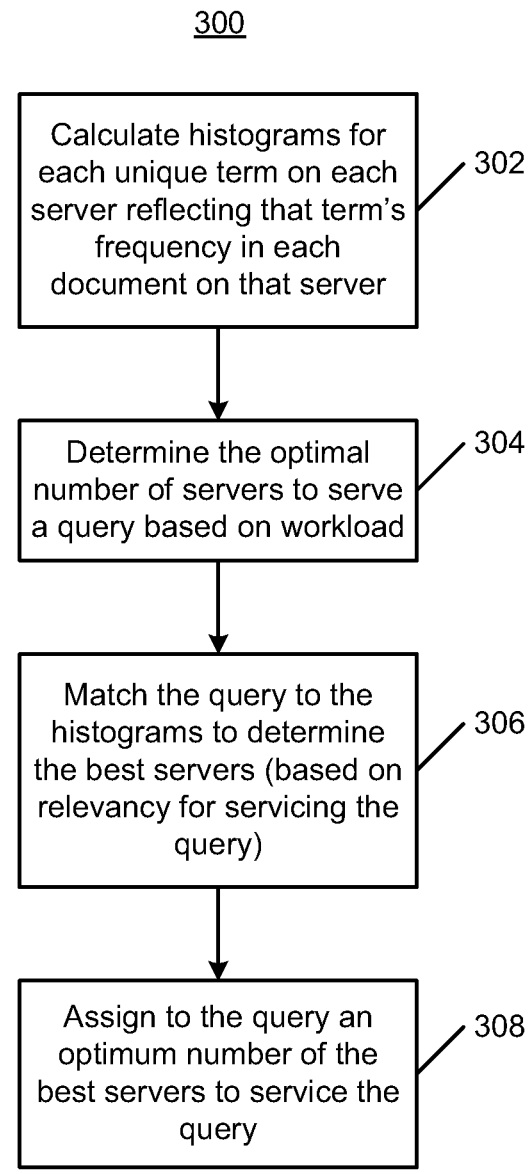
FIG. 2
FIG. 3

*Total Servers: 10    Servers Selected to Service Query: 2*

INDEXING FOR LIMITED SEARCH SERVER AVAILABILITY

BACKGROUND

As the content of the World Wide Web (or "web") grows richer, more users rely on search engines to locate relevant information, thereby making search engines one of the most-used applications of modern information technology. Large web search engines may process billions of queries each day and return results from over tens of billions of documents.

In general, the stringent requirements for a user's positive search experience are low latency and highly relevant search results. However, the load on search engines can vary drastically when, for example, search engine servers become unavailable due to popular events happening around the world, or because of coincidental spikes in global user activity. Often when the query load exceeds the search engine's capacity, excess queries get dropped, and from the user's perspective this can be a very poor experience, perceived as an ungraceful degradation in search quality.

SUMMARY

A number of high-quality results are provided from a subset of servers in a search engine in order to provide search engine users with the perception of a high-quality experience even under unusually high workload conditions. For example, given a collection of documents D and a number of index servers n, implementations are directed to replication, allocation, and selection of search engine index servers such that the quality of query results retrieved from a subset of the index servers m (where m<n) is optimized. These implementations may be suitable for situations where the workload (or other conditions) prevent each query from being served by every index server comprising a search engine in an effort to satisfy user expectations of perceived quality both in terms of speed of the search and relevancy of the returned results.

Certain implementations disclosed herein are directed to replicating documents among servers comprising a search engine based on the value of each document by approximating its value as one of the top search results for one or more exemplary queries. Other implementations are directed to allocating documents among servers comprising a search engine by calculating a relevance value for each document and then distributing the documents evenly to the servers. Yet other implementations are directed to selecting a subset of servers from among a plurality of servers comprising a search engine using term-based, server-specific histograms reflecting the number of instances of the term in each document allocated to each server, and then selecting servers to service a query based on the documents on those servers that would comprise the best search results.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 2 is an operational flow diagram of a balanced allocation method for several implementations of a search engine;

FIG. 3 is an operational flow diagram of a histogram-based selection method for several implementations of a search engine;

DETAILED DESCRIPTION

Figure 1:
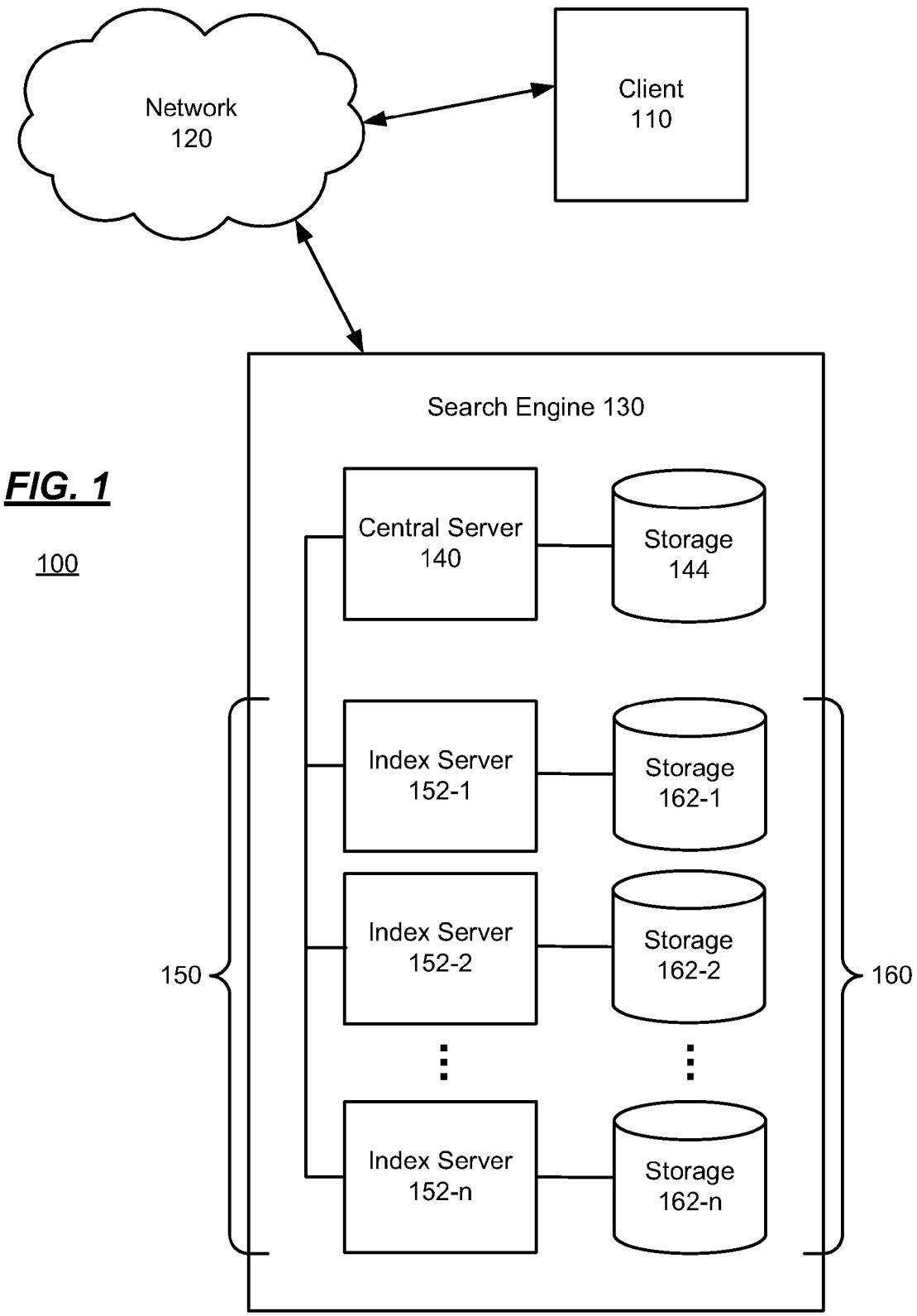
FIG. 1 is an illustration of a search engine in an exemplary network environment in which the numerous implementations disclosed herein may be utilized.

Most search engine users only care about the "top-k results"—where k is often small compared to the number of index servers n comprising the search engine. For a typical search, it is only a (small) subset of index servers—specifically, those containing one of these top-k results—that effectively contribute to serving a query.

Good indexing strategies generally feature consistent availability, high throughput/low latency, and high quality results even under unusually high query loads. Availability pertains to the index servers (and the associated inverted indices and documents) being able to process user queries efficiently and effectively. Throughput/latency generally refer to the response time or speed with which—from the user's perspective—a query is received, processed, and returned with the query results. Quality refers to the relevancy and applicability of the actual results (and particularly the top-k results) returned to the user based on the query.

In the absence of any explicit mapping of documents to index servers, index servers are queried in search systems using simple selection strategies. Under usually high query loads, however, where the index servers cannot handle any queries above their designed peak capacity, excess queries are effectively dropped from their queues. This in turn leads to a decrease in the quality of the returned search results—or, worse yet, queries for which no results are returned at all.

Similarly, quality can also suffer with node failures or "crashes" on index servers having one or more of the top documents—which in principle are not uncommon in large distributed systems. To some extent, search engines can mitigate this problem by keeping multiple copies of the same document on multiple servers (known as "replication," which is discussed in more detail later herein) albeit at higher resource costs (in terms of increased resource usage such as servers, memory, power, etc.). Nevertheless, the unavailability of one or more index servers increases the burden on the remaining index servers to service queries.

The burden on the index servers can also be compounded by "query rewriting" which are techniques utilized by many search engines to obtain better search results for user queries. In query rewriting, a single query is expanded into multiple queries (sometimes using alternate words, spellings, etc.) which are then processed as separate queries and the results are gathered and combined for presentation to the user. Again, with the naive indexing strategies, each of these multiple queries is sent to all of the machines (index servers) in the cluster (search system) and often processed sequentially which results in high latency.

To address these shortcomings in performance under heavy workload conditions, several implementations providing alternatives to naive approaches to allocation and selection are herein presented. Moreover, since it is difficult to optimally solve the allocation and selection problems without replication, also disclosed herein are index serving implementations that utilize several different approaches to replication to achieve more optimal results in view of the allocation and selection strategies presented herein.

FIG. 1 is an illustration of a search engine 130 in an exemplary network environment 100 in which the numerous implementations disclosed herein may be utilized. The network environment 100 may include a client 110. The client 110 may be configured to communicate with a search engine 130 through a network 120. The network 120 may be a variety of network types including the public switched telephone network (PSTN), a cellular telephone network, and a packet switched network (e.g., the Internet). While the client 110 and the search engine 130 are illustrated as being connected by the network 120, in some implementations it is contemplated that the client 110 and the search engine 130 are directly connected to each other or even executed by the same computing system.

Figure 6:
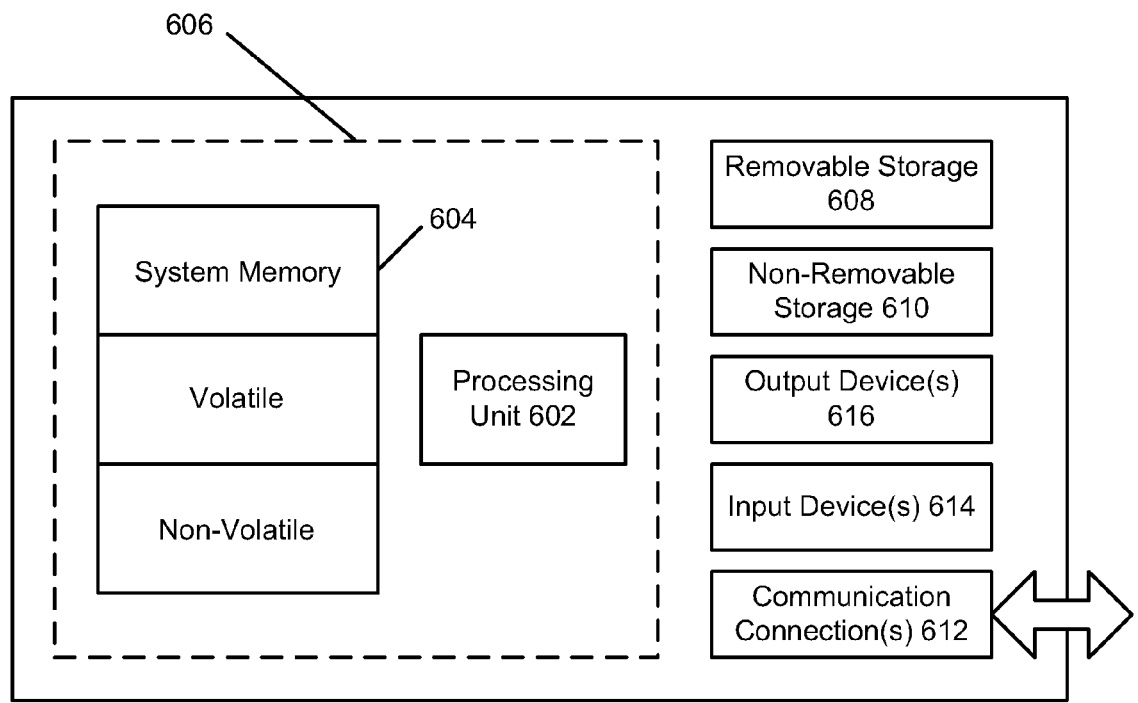
FIG. 6 shows an exemplary computing environment.

In some implementations, the client 110 may include a desktop personal computer, workstation, laptop, PDA, cell phone, or any WAP-enabled device or any other computing device capable of interfacing directly or indirectly with the network 120 such as a computing device 600 illustrated in FIG. 6. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the search engine 130 or to provide information to the search engine 130. Other applications may also be used by the client 110 to access or provide information to the search engine 130, for example. In some implementations, the search engine 130 may be implemented using one or more general purpose computing systems such as the computing device 600 illustrated in FIG. 6.

In some implementations, the search engine 130 may receive—at a central server 140 comprising central storage 144—a search query from a user of the client 110 and search a corpus of database documents (or any corpus of searchable documents) to find matching documents for the query. The matching documents may then be presented or identified to the user who submitted the query. The matching documents may comprise one or more documents from a plurality of document stores 160 (individually storage 162-1, storage 162-2, . . . , storage 162-n) maintained by a plurality of index servers 150 (individually index server 152-1, index server 152-2, . . . , index server 152-n) comprising the search engine 130. The document stores 160 may store documents received or collected from one or more users. For example, the document stores 160 may store documents collected from the Internet. While the document stores 160 are illustrated as being a local part of the search engine 130, it is contemplated that the document stores 160 may be separate from but connected to the search engine 130 directly or indirectly via the network 120. Moreover, the search engine 130 may process the documents from the document stores 160 to generate document data which, in turn, is stored in the document stores 160 or on the central storage 144.

User experience on a search engine 100 is largely governed by two factors: latency, which measures how fast the results are returned to the user, and accuracy, which measures how relevant the results are to the query. To optimize performance, search engines such as the search engine 130 (and, in many implementations, the central server 140 and index servers 150 that comprise the search engine) typically employ an inverted index structure that allows efficient retrieval of documents containing a particular term (or word, feature, or other searchable element). This inverted index over a collection of terms and the underlying documents associated with such terms consist of a set of lists, one for each term, typically sorted by the relevance of each document in the collection for that term.

The search indices of commercial search engines are extremely large and consume a lot of data center resources including CPU, memory, and power. As shown in FIG. 1, the search engine 130 may exist on multiple servers (e.g., 140 and 150) with multiple data stores (e.g., 144 and 160). In this kind of configuration, challenges pertaining to search engine performance include allocation (or "index generation"), selection (or "index serving"), and replication (or "document redundancy").

Allocation pertains to the assignment of documents to index servers and the building of inverted indices on each index server corresponding to the collection of documents it is allocated. In general, allocation is performed prior to query processing. One simple approach to allocation (which can be referred to as "naive allocation") is the random assignment of documents to the plurality of index servers using, for example, one or more simple hashing schemes. This approach provides nominally acceptable availability since each index server has the same probability of receiving a relevant document, and on average each index server should receive about the same number of relevant documents overall. However, it is statistically unlikely that such a random distribution would in fact result in each index server receiving the same number of highly relevant documents but, instead, some servers would have more and some less due to natural variances in a random distribution. In addition, to return the true top-k results to a user query, this kind of simple approach uses every index server to service the query and return results that could then be combined to provide the collective results to the user, and thus the quality of such a system is vulnerable to high-workload situations or other situations where queries cannot be run on every index server.

As an alternative to simple allocation, some implementations instead use a property-based allocation where documents are first grouped by certain properties, and then documents with the same or similar properties are assigned to the same server. For example, by treating the domain of a document as a property, documents with the same or similar domains can be grouped together and stored on a single index server in certain implementations. For other implementations, documents that tend to be selected in response to similar queries can be grouped accordingly, while for yet other implementations documents could be grouped based on their statistical clustering around certain predefined or identified topics of interest. However, while property-based allocation potentially minimizes the number of index servers needed to serve any single query (since the relevant documents will likely be grouped together on relatively few index servers), property-based allocation cannot guarantee good availability since these groups of documents having similar properties and assigned to the same server are vulnerable to any failures of that particular index server, including but not limited to periods of unavailability when the system is in a high-workload situation.

An allocation approach that attempts to overcome these shortcomings, and utilized by several implementations disclosed herein, is a balanced allocation approach that is directed to minimizing the worst-case loss of the system. In the balanced allocation approach, the value of every document in the system is approximated by, for example, its expected relevance score to one or more random queries (using, for example, TF/IDF scoring, BM25 scoring, or any other scoring methodology known and appreciated by those of skill in the relevant art). The documents are then evenly distributed among the index servers based on these scores such that the highest scoring documents are evenly distributed among the servers and, ultimately, the sum total of the document scores across all servers is relatively even.

Where documents are dynamic and/or document score calculations and assignments are to be conducted more continuously, certain implementations may sequentially assign new documents to the index server with the lowest sum total value of documents scores (and thus, in effect, the lowest server always receives the next document to be received, scored, and allocated). For other implementations, documents may be first sorted in order based on their scores before then being assigned from highest to lowest to the server having the lowest total of document scores.

FIG. 2 is an operational flow diagram 200 of a balanced allocation method for several implementations of a search engine. At 202, the relevance value of each document from among a plurality of documents in a search engine system is calculated based on the document's relevance to one or more exemplary search queries such as, for example, a set of hypothetical user queries or a set of frequently used queries and/or query terms. Alternately, or additionally, the value of the document can be calculated using any of several other methodologies such as, for example but without limitation, the aggregate value of the individual words comprising the document, a PageRank of the document, a StaticRank of the document, an aggregate value of "like" votes pertaining to the document (from, e.g., Facebook or some other source), an aggregate value of web links pointing to the document, or a relative measure of popularity of the document from any of several other sources, among many other approaches known and appreciated by those of skill in the relevant art.

At 204, these documents are sorted from most valuable to least valuable based on their relevance values. At 206, these documents are serially (one-at-a-time) distributed or assigned (indexed and stored), in order from the highest value document to lowest value document, to the index server in the search engine system having the lowest aggregate sum of document values.

Selection pertains to the real-time query process where, when a query is received, some or all of the index servers are selected to process the query, and each selected index server returns a set of top results to the user query from the allocation of documents it maintains. These results are then typically aggregated, redundancies (if any) are eliminated, and the remaining results are ordered by some kind of ranking module in the search engine.

The specific method of selection employed effectively determines the speed and, together with allocation, the quality of the system. Most selection methods are typically implemented in two parts: (1) an offline process that pre-computes (in advance) certain information to be later used in serving a query, and (2) a runtime process that (in real-time) uses these statistics to quickly and efficiently select the specific index servers called upon to serve a query when it is received.

For high quality results, and without regard to high workload conditions, an approach for the latter runtime process is to process every query on every server every time. This simple approach to selection (which can be referred to as "naive selection") is particularly easy to implement as there is no need to maintain any knowledge of which documents reside on which index server in order to still be able to return the top documents for the given query from the corpus of documents maintained on the index servers. In effect, by considering every document on every server, the index server is able to ensure that the best documents are identified, rank ordered, and presented in response to the query. However, selecting all servers may not be an option when the system is experiencing abnormally high workloads and ensuring maximum quality for some queries would result in dropped queries (i.e., minimum quality). Therefore, in high workload situations, the selection strategies use only a fraction of index servers in the system in order to ensure that all queries get served (albeit at less than maximal quality).

One approach in high workload situations (or other circumstances when querying all servers is impractical) is to select a subset of servers at random to serve a user query. This approach, unlike most other selection strategies, requires no pre-computation or the need to store any pre-computed statistics (and thus is relatively simple to implement). Instead, a subset of index servers is randomly selected to answer a query when it is received. The number of index servers included in the subset may also be randomly determined, but more often this number may be quickly calculated based on the number of servers available compared to the flow of incoming work such that the number of servers in the subset can range from all servers (which can also be the default for non-high workload situations) to a single server per query (which is essentially the maximum capacity of the system in any implementation). However, without any pre-computed information to help select the specific servers for a particular query, quality naturally suffers if the best documents do not reside on the servers selected—and this problem is exacerbated when combined with property-based allocation where all of the best documents may reside on a single server that effectively increases the probability that the best documents may not be selected (i.e., whenever that server is unavailable).

An alternative approach to selection strategy for some implementations is to use an offline pre-computation process to randomly sample a small fraction of documents in the system and then generate an index of these samples that is stored in a central reference location (e.g., a central server) in advance. Then, at runtime when a given query is received, this central index is referenced to help determine the specific servers to include in the subset of index servers chosen to serve the query. This selection index approach may be combined with a property-based allocation strategy such that the limited sampling is more consistently representative of the documents found on each server. Nevertheless, even with random allocation the index can be helpful in identifying at least some servers that have at least some relevant documents and therefore improve speed and quality of the results.

Yet another approach to selection strategy utilized by other implementations is a server-score approach where, during the offline pre-computation process, the occurrence of each term in every document on a server is counted and stored for that server in a central reference location (e.g., a central server). At runtime, and upon receipt of a query, the terms of the query are compared to the same terms counted on each server, and those servers with the highest counts matching the query terms are selected to serve the query. In some implementations, certain terms may be weighted such that, for example, longer words in a query have a heavier weight than shorter words, or specific and rarer words are given more weight than common and more general words, and so forth. Regardless, the server-score approach helps locate relevant documents on the assumption that the servers that have the most occurrences of search terms are more likely to have relevant documents than those servers having fewer of the relevant search terms from the query. However, while this counting approach can help identify the servers having the most frequent occurrence of query terms, the approach is also vulnerable to including servers that have a lot of marginally relevant documents (and thus a high number of uses of the relevant search terms in a diluted manner) while excluding a server that has a single highly relevant document (but where the search terms are concentrated and obscured by the sheer volume of other terms in other documents).

For several implementations, a document-centric approach to selection strategy utilizing histograms is used to select the index servers with the highest estimated number of relevant documents to any given query by counting the number of instances of each term in each document and then to store this information in a central reference location (e.g., a central server). In some instances, this information might be pre-computed and stored as a histogram listing the documents on the server with values corresponding to, for example, the number of times the term is found in each such document. In some implementations, zero-value documents might not be included in the histogram at all, or documents with term counts lower than some specified counting threshold might be excluded from the histogram.

Again, in some implementations certain terms may also be weighted such that, for example, longer words in a query have a heavier weight than shorter words, or specific and rarer words are given more weight than common and more general words, and so forth. Then, at runtime when a query is received, the servers having the most relevant documents, the greatest numbers of most relevant documents (weighted or otherwise, depending on the implementation), and/or the greatest number of relevant documents (most relevant or otherwise) are selected to serve the query based on both the strength of match between the words in the query and the words in the individual documents (to find the highly relevant documents) as well as the number of highly relevant documents found on each index server (to find the most relevant servers). In certain implementations, the specific servers selected may also be at least partially based on minimizing the total number of servers utilized in serving the query.

FIG. 3 is an operational flow diagram 300 of a histogram-based selection method for several implementations of a search engine. At 302, a histogram of each specific (and unique) term on the server is calculated showing the frequency (i.e., the number of instances) of that term in each document allocated to that server, and such histograms for each term are determined for each server (i.e., one histogram per term per server). This information is calculated in advance (i.e., prior to servicing queries) and, in certain embodiments, is centrally stored.

At runtime and upon receipt of a query, at 304, the system determines the optimum number of servers on which to run the query in view of the workload on the system. At 306, the system then compares the query to the histograms to determine which servers will best service the query (e.g., based on relevancy to the query) and, at 308, selects an optimum number of servers from among these best servers and assigns the query to them for servicing.

Replication is the process of determining how many copies of a particular document are made available across a plurality of index servers, and the total number of copies (and the total number of index servers on which a copy of that document will reside) is referred to as the replication factor for that document. Allocation therefore also includes the process of determining which specific index servers (total in number to the replication factor) are assigned a copy of the document. For efficiency, replication (like allocation and the histograms of selection) is calculated in advance and generally prior to allocation. Similarly, selection also includes the process of determining which servers are used to answer a query at runtime, but for certain implementations this may done in view of the extent that certain documents are replicated.

A replication strategy is considered because the number of copies of a document (and thus the number of servers that have a copy of that document) directly impacts the probability of whether that document will be on an index server called upon to serve a given query and, if a top-k result, include that document in the overall results returned for the given query. As such, a goal of a replication strategy is to efficiently utilize the space available for storing multiple copies of the documents across multiple index servers.

While some implementations of replication processes may perform replication in conjunction with an allocation process, several implementations of a replication process perform replication without regard to how the copies will actually be allocated—that is, for these implementations, replication may be performed independently of which servers will ultimately receive the additional copies of the document.

In general, the amount of space available for replication on a plurality of index servers can be quantified as a fraction or percentage (e.g., 0.15 or 15%) of the total space provided by the plurality of index servers and, generally, equates to the amount of space left over after each document has been stored once on an index server (this first instance comprising the "original" form of the document in the system). Moreover, given that most allocation strategies employ methodologies to balance documents across the index servers, this percentage or fraction also represents the relatively equal space available on each individual server (e.g., 0.15 or 15% of the space on each server, and $0.15/n$ or $15\%/n$ of the total space available in a system comprising n servers).

Given the space available, a replication process determines (a) which original documents are copied to other servers and (b) how many copies of the selected original document are made (to be stored on other servers). Regarding the latter, the number of copies made typically corresponds to the number of additional servers on which the document is to be stored presuming that no more than one copy of the document (an original or a replication) is to be stored on a single index server (which would effectively defeat the underlying purpose of replication).

In certain implementations, a priority of the replication strategy may be to replicate each original document at least once (if available storage space permits), and then selectively replicate additional copies of certain documents to the remaining unused storage space. This approach effectively gives higher priority to creating a first replication (two copies total, the original and the replication) of an original document than it does to creating a second replication (three copies total, one original and two replications) of even the highest value document in the entire system. This approach ensures that at least one copy of each document is available despite the failure and unavailability of a single server in the system (presumably the server on which the original copy of the document resides).

The foregoing notwithstanding, one way to replicate documents is to treat the documents equally and distribute the additional space equally amongst the documents. This straightforward approach to achieving "uniform replication" can be achieved by randomly ordering the documents and then replicating each document in order (i.e., when reaching the end of the list, continuing with the start of the list) until there is no more unused storage space remaining.

Another replication strategy—referred to herein as quality-based replication—is to give preference to high value documents, that is, those documents that are more likely to be among the top-k results of received search queries. In several implementations this strategy may be implemented where the number of copies of each document is based on the relative value of each document, such that the highest value document is replicated the greatest number of times, the next highest value document is replicated the second greater number of times, and so on. In these implementations, the total number of replicated documents may be determined based on some minimum threshold value, the total amount of excess storage space available, or any of several other criteria alone or in combination with each other.

In contrast, some alternative implementations of the replication strategy may instead order the documents by value and then, starting with the most valuable, replicate the document to every other server (such that every server has a copy of that document) on the list until there is no more unused space.

Yet other implementations may instead calculate the number of replications for each document proportional to the value score for that document compared to total value scores of all documents (in some instances those documents with values above a certain minimum threshold) as a fraction of the unused storage space available. For certain implementations, quality based replication may be employed only after one replication of every original document is created and stored (to ensure the existence of two copies of each document) and then allocating the remaining unused space for additional copies of high value documents in some kind of descending order of value until there is no more space available.

Yet another replication strategy is workload-aware replication that is particularly useful when the maximum workload is known (or established), and hence the number that will be available index servers to service a query is similarly known. In workload-aware replication, high value documents are replicated similar to the methods employed in quality-based replication but with a cap on the maximum number of copies of the document that are stored on the system. This "max cap" is equal to the number of copies used to ensure that at least one server from among the plurality of servers having a copy of the high value document is guaranteed to be among the number of servers available to service a query when received.

In other words, if, based on workload, m servers will be available from among the total number of n servers in the system, then a high value document needs to exist on only the number of servers equal to one more than the number of unavailable servers (that is, $n-m+1$ servers). Since the number of servers on which the high value document is stored is greater than the number of servers that are not available to service a query, the query is guaranteed to be served by at least one server containing the high value document. Conversely, for more copies than the cap (where the number of total copies is greater than the number of unavailable servers, $n-m+1$), each such cap surplus copy effectively carries no benefit. Therefore, when the maximum number of copies of high value documents is capped—and thus take up less space than a number of copies exceeding the cap—the additional space made available by the cap enables replication of even more high value documents.

In addition to capping the maximum number of replications for any document, certain implementations may also consider the relative value of each additional copy of a document relative to each additional copy of other documents (including less value documents). For each additional copy of a document as the number of copies increase, there is a diminishing return on the incremental benefit of each such additional copy in sequence.

Figure 4:
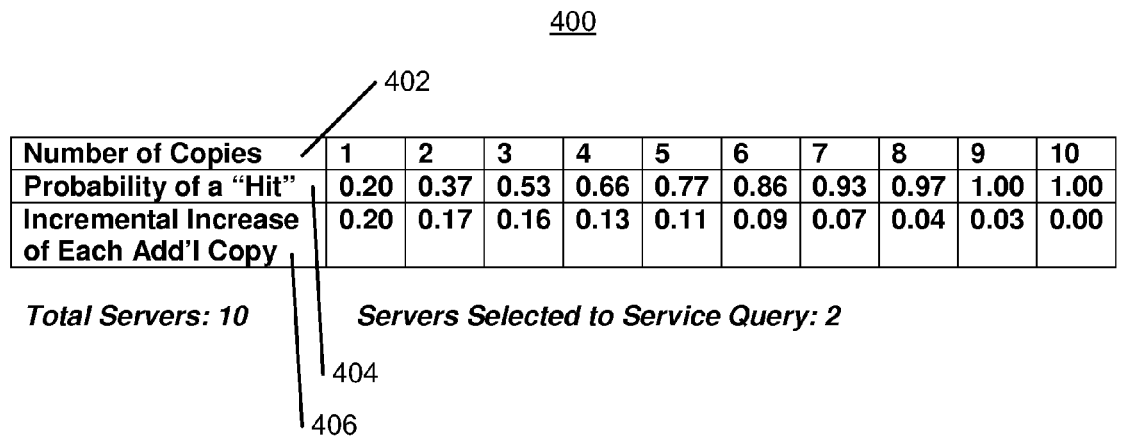
FIG. 4 is a table illustrating the probability that a document replicated a certain number of times to produce the number of copies shown will have a copy residing on at least one server from among a fixed number of servers randomly selected (or "hit") from among a plurality of servers.

FIG. 4 shows a table 400 illustrating the probability that a document replicated a certain number of times (x) to produce the number of copies shown (including the original document) in first row 402 will have a copy residing on at least one server from among a fixed number of servers (m) randomly selected (or "hit") from among a plurality of servers (n), where m=2 and n=10. The total probability of a hit based on the number of copies is shown in the second row 404, and the incremental change to the probability of a hit ($\delta(x)$) for each additional copy is shown in the third row 406.

Consequently, the results of this table suggest that increasing the number of copies from, say, two (2) to three (3) has greater benefit than when the number of copies is increased from, say, seven (7) to eight (8) copies. Hence, given two documents with similar values, it would be preferable for both documents to also have similar replication counts. Moreover, given a high value document with a high replication count and a relatively medium value document with a low replication count, it may in fact be preferable to replicate another copy of the medium value document (for the greater net benefit) than it would to replicate another copy of the high value document.

Implementations are directed to the application of a greedy replication strategy. In some such implementations, the greedy replication approach may be applied by weighting the document value for each incremental replication of that document based on the diminishing returns of that replication in increasing the probably of a hit for that document. For certain of these implementations, the calculation might be the product of the document value by the fractional (or percentage) increase in hit probability for the next replication of that document.

For example, in a system corresponding to the table of FIG. 4, given a document A with a document value of, e.g., 200 and a document B with a value of, e.g., 100, where A already has eight (8) copies and B already has five (5) copies, the value of the next copy of B (0.09×100=9) is greater than the value of the next copy of A (0.03×200=6), so document A should be the next document replicated (as between documents A and B). For certain other implementations, additional variables may be introduced into the calculation, including but not limited to weightings assigned for relative document value, as well as thresholds and other limitations that might be applied to the outcomes. The value of incremental gains for the next copy of each document in a system can be implemented using, for example but not limited to, a binary heap structure where the appropriate value is updated for each replication in the system, and then the updated data structure is parsed to identify the next most beneficial replication to conduct, and so on until there is no more available space.

Figure 5:
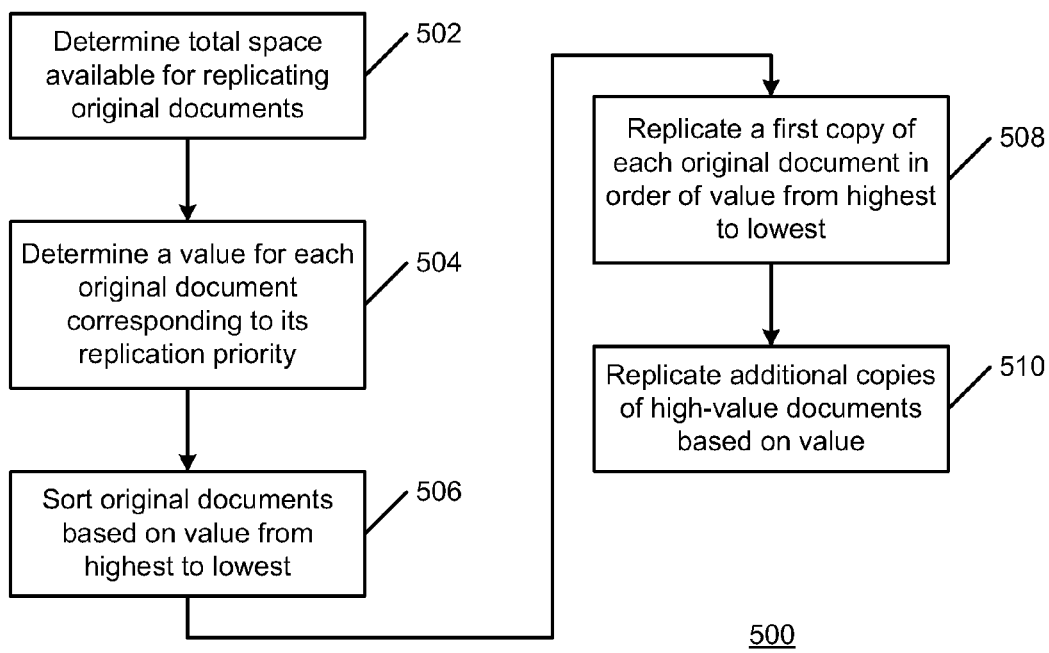
FIG. 5 is an operational flow diagram of a method of greedy replication for several implementations of a search engine.

FIG. 5 is an operational flow diagram 500 of a method of replication for several implementations of a search engine. The total space available for replicating documents (each an original document at this point) is determined at 502. At 504, the value of each document is determined corresponding to the replication priority of that document, where documents more likely to be among the top-k results of a search query are given high value (and higher priority) than documents less likely to be so included. In some implementations this value may be based on the scoring of that document to an exemplary search such as a hypothetical search using high value search terms.

At 506, the original documents are sorted by value and, at 508, each original document is replicated to create a first copy of the original document (and a total of two copies including the original document) where the replication is conducted serially in order from highest value document to lowest value document unless and until the extra storage capacity is consumed. If every document is replicated to create a complete set of first copies, then at 510 additional copies of high-value documents are then created. In several implementations these additional copies are created such that each document has at least as many copies as any document of lesser value. In certain implementations, the additional copies of any document do not exceed a maximum cap of documents based on the projected maximum workload of the search engine wherein it is projected that every query will be serviced by at least one server having a copy of the document. In some implementations the additional replication of a lower value document may occur before an additional replication of a high value document when the incremental value of an additional replication of a lower value document is greater than the incremental value of an additional copy of a higher value document based on the relative values of the documents and the relative increase in probability of a hit for each document if replicated one additional time.

FIG. 6 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of allocating a plurality of documents among a plurality of servers comprising a search engine, the method comprising:

calculating a relevance value for each document from among the plurality of documents; and distributing the plurality of documents to the plurality of servers based on the calculated relevance value for each document from among the plurality of documents, wherein the plurality of documents are sorted from a highest value document to a lowest value document based on the relevance value for each document, and wherein the plurality of documents are serially distributed to the plurality of servers in order from the highest value document to the lowest value document, and wherein the plurality of documents is distributed to the plurality of servers such that each document from among the plurality of documents is assigned to a server having a lowest aggregate sum of document values.

2. The method of claim 1, wherein the relevance value of a document from among the plurality of documents is calculated based on a relevance score of the document to at least one exemplary search query.

3. The method of claim 1, wherein the relevance value of a document from among the plurality of documents is based on at least one measure from among the following plurality of measures: an aggregate value of words comprising the document; a PageRank of the document; a StaticRank of the document; an aggregate value of like votes pertaining to the document; an aggregate value of web links pointing to the document; and a relative measure of popularity of the document.

4. The method of claim 1, wherein no more than one copy of a document is allocated to each server.

5. A method of selecting a subset of servers from among a plurality of servers comprising a search engine to service a query, the method comprising:

prior to receiving a query, calculating a plurality of histograms for each server of the plurality of servers, wherein each histogram from among the plurality of histograms uniquely corresponds to a specific term in at least one document allocated to the server, and wherein each histogram reflects the number of instances of the specific term in each document allocated to the server;

receiving a search query;

analyzing the plurality of histograms to determine the relevancy of each server to the received search query; and selecting a subset of servers from among the plurality of servers to service the query based on the determined relevancy of each server to the received search query, wherein each histogram reflects the number of instances of the specific term in each document allocated to the server such that each histogram only includes a listing of documents that meet or exceed a minimum threshold of the number of occurrences of the specific term in each document.

6. The method of claim 5, wherein the subset of servers comprises a specific number of servers less than a total number of servers comprising the plurality of servers, and wherein the specific number of servers is based on the workload of the search engine.

7. The method of claim 5, wherein the plurality of histograms are centrally stored.

8. The method of claim 5, wherein the subset of servers selected is based on the number of relevant documents on each server included in the subset of servers.

9. The method of claim 5, wherein the subset of servers selected is based on at least one of the most relevant documents on each server included in the subset of servers.

10. The method of claim 5, wherein the subset of servers selected is at least partially based on minimizing the number of servers comprising the subset of servers.

11. A method of replicating documents from among a plurality of original documents in a search system comprising:

determining, by a computing device, a total space available for replicating documents from among the plurality of original documents;

determining, by the computing device, a value for each document among the plurality of original documents corresponding to said priority for replication; and replicating, by the computing device, each document from among the plurality of documents according to a value of each document and based on the total space available for replicating documents, wherein each original document is replicated a total number of times based on said value such that each document is replicated no less times than any lesser relevant documents, and wherein each original document is replicated no more than a maximum number of times corresponding to the maximum expected workload of the system such that each document is guaranteed to reside on at least one server selected from among a plurality of servers comprising the search system.

12. The method of claim 11, wherein the value of each document is calculated based on a relevance score of the document to at least one exemplary search query.

13. The method of claim 11, wherein each original document is replicated at least once before any original document is replicated more than once.

14. The method of claim 11, wherein each original document is replicated a total number of times based on its document value and the incremental value of each additional copy.

* * * * *